United States Patent [19]

Lin

[11] Patent Number: 4,688,097
[45] Date of Patent: Aug. 18, 1987

[54] D.C.-COUPLED VIDEO CLAMPING CIRCUIT

[75] Inventor: Wen T. Lin, Horsham, Pa.

[73] Assignee: Jerrold Electronics Corp., New York, N.Y.

[21] Appl. No.: 924,880

[22] Filed: Oct. 30, 1986

[51] Int. Cl.$^4$ ............................................. H04N 5/18
[52] U.S. Cl. ..................................... 380/15; 358/171
[58] Field of Search ................ 358/171, 172, 173, 34, 358/121; 330/11

[56] References Cited

U.S. PATENT DOCUMENTS

| | | | |
|---|---|---|---|
| 3,557,305 | 1/1971 | Dann | 358/171 |
| 3,582,545 | 6/1971 | Thorpe | 358/171 |
| 3,750,038 | 7/1973 | Meise | 358/171 |
| 4,389,671 | 6/1983 | Posner | 358/121 |

*Primary Examiner*—Tommy P. Chin
*Attorney, Agent, or Firm*—Hopgood, Calimafde, Kalil, Blaustein & Judlowe

[57] ABSTRACT

A d.c.-coupled video clamping circuit is disclosed for operation with normal video signals and sync suppressed scrambled video signals. For receiving normal video signals, a feedback path detects variations in sync tip level from a reference level and applies a corresponding control voltage to a d.c. signal amplifier, thereby to clamp and maintain the sync tip at a fixed (black) level. For receiving sync suppressed scrambled video signals, the feedback path is disabled and a fixed reference voltage is applied to the d.c. signal amplifier.

3 Claims, 1 Drawing Figure

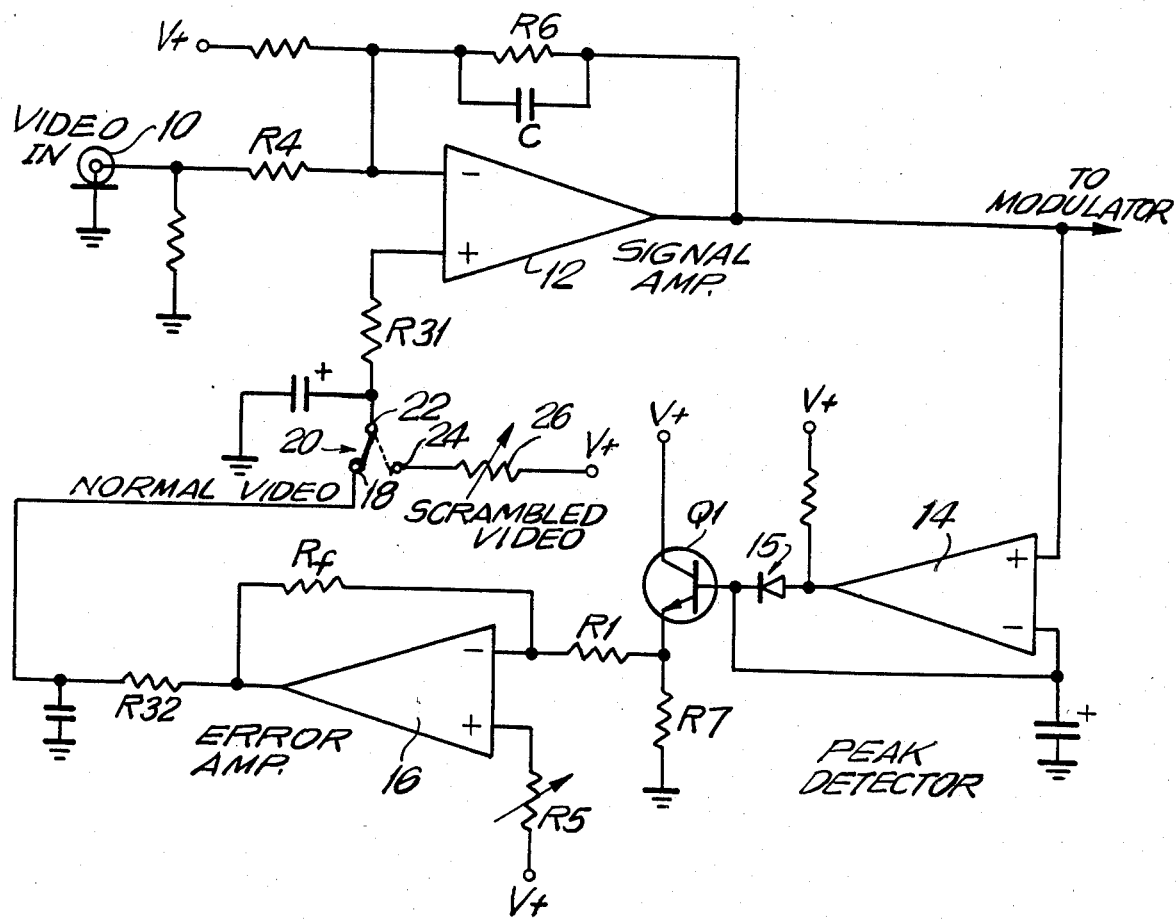

D.C.-COUPLED VIDEO CLAMPING CIRCUIT

The present invention relates generally to television signal processing, and more particularly to a d.c. circuit for clamping the sync tip of a video signal to a fixed level.

Television signals include control information such as synchronizing pulses and color burst signals, along with the time-varying picture or video signals. The composite signal exhibits a d.c. level which must be maintained in order to properly characterize the video information applied to a modulator of a cable television system head end. More specifically, to assure a proper modulation reference of the video signal, the extreme or tip of the synchronizing pulse signal must be clamped to a fixed level, which is commonly designated as the black level in the demodulator and as the zero percent modulation reference for the modulator. In a conventional television receiver, this clamping is typically achieved by one of several known designs of an a.c.-coupled clamping circuit, such as discussed in U.S. Pat. No. 3,750,038. In one typical conventional clamping circuit, a charge storage capacitor is employed on the signal path to keep the sync tip at the desired fixed level.

The use of satellites and cable to transmit scrambled television signals to subscribers who are equipped with descrambling has resulted in a substantial increase in the transmission of scrambled television signals along with normal, or nonscrambled television signals. In one common method of scrambling a television signal, the level of the synchronizing signal in the transmitted signal is suppressed. A sync suppressed scrambled signal, however, cannot be processed by the conventional a.c.-coupled sync clamping circuit since the sync tip is hidden in the scrambled signal. Since there is no black level sync tip to which the signal can be clamped, the conventional a.c.-coupled clamp will clamp the scrambled signal to any level. For this reason, to enable a conventional cable television head end equipment to process both normal and sync suppressed scrambled signals, a separate d.c.-coupled amplifier typically is provided to process the scrambled video signal. This additional clamping circuit results in an increased cost and complexity in the circuit hardware employed in the television receiver or in the converter associated with the receiver to allow the user to view both normal and scrambled television signals.

It is an object of the present invention to provide a signal clamping circuit that is effective for operation with both normal and sync suppressed scrambled video signals.

It is a more specific object of the present invention to provide a video clamping circuit in which a single d.c.-coupled clamping circuit is effective to perform processing of both normal and scrambled video signals.

In the circuit of the present invention, for processing a normal video signal a feedback path including a signal amplifier, a peak detector, and an error amplifier is employed to detect and compensate for any deviations in the sync tip level and to clamp the sync tip to a reference or black level. When it is desired to receive scrambled video signals in an unscrambled form, switch means are provided to disable the feedback path and to apply a fixed reference voltage to the signal amplifier.

To the accomplishment of the above and such further objects as may hereinafter appear, the present invention relates to a d.c.-coupled video clamping circuit substantially as defined in the appended claims and as described in the following specification, as considered with the accompanying drawing, which is a schematic diagram of a d.c.-coupled clamping circuit according to one embodiment of the invention.

Referring to the drawing, the circuit therein illustrated includes an input terminal 10 for receiving an input video signal, which may be either normal or scrambled by having its sync suppressed. Input terminal 10 is connected through a resistor R4 to the inverting input of a d.c. operational signal amplifier 12. A feedback path, including the parallel connection of a resistor R6 and a capacitor C, is connected between the output of amplifier 12 and its non-inverting input.

The output of amplifier 12 is applied to an external modulator (not shown) and to the non-inverting input of a comparator 14, the output of which is connected to the anode of a diode 15. The output or cathode of diode 15 is coupled back to the other inverting input of comparator 14, and together with the comparator constitutes a peak detector circuit which detects the level of the sync tip signal in the normally received television signal.

The output of the peak detector circuit is applied to the base of a transistor Q1, the emitter of which is connected through a resistor R1 to the inverting input of an error amplifier 16. A resistor R7 is connected between the emitter of transistor Q1 and ground. Transistor Q1 operates as an impedance buffer between the peak detector circuit and the error amplifier. The non-inverting input of error amplifier 16 is coupled through a variable resistor R5 to a reference potential V+, and the output of error amplifier 16 is connected through a feedback resistor $R_f$ to the other (minus) input of error amplifier 16. The value of resistance of resistor R5 is set to establish a reference voltage to which it is desired to clamp the sync tip.

The output of error amplifier 16 is coupled through a resistor R32 to a first contact 18 of a mode select switch 20, which includes a switch member movable between a second contact 22 and a third contact 24. Contact 22 is connected through a resistor R31 to the other (plus) input of signal amplifier 12, and contact 24 is connected through a variable resistor 26 to the reference d.c. voltage source V+.

In the operation of the circuit of the invention, when it is desired to receive a normal, that is, unscrambled, video signal, switch 18 is placed in the condition illustrated by the solid line in the drawing to connect contacts 18 and 22, thereby connecting the d.c. output of error amplifier 16 to the plus input of d.c. signal amplifier 12. The input video signal is amplified (typically by 10 db) and inverted in d.c. signal amplifier 12. The amplified and inverted signal obtained at the output of signal amplifier 12 is applied to the peak detector circuit at which the d.c. level of the sync tip is detected. That level signal is applied through the buffer to an input of error amplifier 16 where the sync tip level is compared with a reference level signal applied to the other input of error amplifier 16 through variable resistor R5. If there is a deviation between the detected and reference sync tip levels, a corresponding error signal is produced and amplified in error amplifier 16.

The amplified error signal is applied through switch 20 to one input of d.c. signal amplifier 12 to control the gain of the signal amplifier so that the output sync tip at the output of signal amplifier 12 is maintained substantially at a desired reference (black) level. The sync tip level is thus continuously monitored, and by virtue of the feedback arrangement, any variation in the sync tip level is substantially eliminated or minimized.

The relationship of the variations in the output and input sync tip levels can be expressed as:

$$\frac{Vo}{Vin} = \frac{R_f \times R_3}{R_1 \times R_4}$$

Where
$R_3 = R_{31} + R_{32}$

From this equation, it can be seen that a less than 2 percent variation in sync tip level can be readily achieved by a suitable setting of the gain of error amplifier 16.

When it is desired to receive scrambled video signals, switch 20 is placed in the position shown in broken lines in the drawing in which contact 22 is connected to contact 24. In this condition for receiving scrambled video signals, the feedback path consisting of the peak detector and error amplifier is disabled or disconnected, and a fixed reference voltage is applied to the d.c. signal amplifier 12 through the variable resistor 26 to establish a fixed gain for the d.c. signal amplifier and thereby to establish a reference at which the scrambled video is to be clamped as is desired for scrambled video processing.

It will be appreciated from the foregoing that since the clamp circuit is d.c.-coupled, it can be employed for processing scrambled video signals by applying a fixed reference voltage instead of the sync tip reference voltage to the signal amplifier, and that the d.c.-coupled clamp is better than an a.c.-coupled clamp in both component count and cost and can be readily employed to accept and process any kind of video input. It will also be appreciated that modifications may be made to the embodiment of the invention hereinabove described without necessarily departing from the spirit and scope of the invention.

What is claimed is:

1. A d.c.-coupled video clamping circuit comprising an input terminal, a d.c. signal amplifier having a first input for receiving normal or scrambled video signals coupled to said input terminal; feedback means connected to the output of said signal amplifier, said feedback means including means for detecting the sync tip level of a normal video signal and an error amplifier coupled to the output of said detecting means for producing an error signal representative of variations in the sync tip level from a desired reference level; and control means effective when in a first condition, when it is desired to receive a normal video signal, to apply said error signal to a second input of said signal amplifier, and effective when in a second condition, when it is desired to receive a scrambled video signal, to connect a reference voltage to said second input of said signal amplifier.

2. The clamping circuit of claim 1, further comprising an impedance buffer interposed between the output of said detecting means and the input of said error amplifier.

3. The d.c. clamping circuit of claim 1, in which said control means comprises a switch operable between said first and second conditions.

* * * * *